(12) United States Patent
Yamaguchi et al.

(10) Patent No.: US 7,878,035 B2
(45) Date of Patent: Feb. 1, 2011

(54) LOCK SYSTEM OF SMALL ARTICLE COMPARTMENT IN VEHICLE

(75) Inventors: Taishi Yamaguchi, Aichi-ken (JP); Yasuhiro Sakakibara, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 280 days.

(21) Appl. No.: 12/222,236

(22) Filed: Aug. 5, 2008

(65) Prior Publication Data
US 2009/0038352 A1 Feb. 12, 2009

(30) Foreign Application Priority Data
Aug. 7, 2007 (JP) .............................. 2007-205340

(51) Int. Cl.
B65D 55/14 (2006.01)

(52) U.S. Cl. .............................. 70/161; 70/257; 70/263; 70/279.1; 70/280; 70/283; 70/283.1; 70/DIG. 30; 200/43.11; 200/43.13; 292/38; 292/144; 292/DIG. 37; 296/24.34; 296/37.8; 296/37.12

(58) Field of Classification Search .................... 70/241, 70/243, 248, 250, 251, 278.3, 279.1, 278.7, 70/283, 283.1, 262–265, 256, 257, 208, DIG. 30, 70/158–162, 280–282; 200/43.01, 43.07, 200/43.11, 43.13; 292/28, 38, 50, 171, 141, 292/125, 133, 225, 235, DIG. 37, 144; 296/37.12, 296/24.34, 37.8, 37.13, 37.14, 37.15, 37.1
See application file for complete search history.

(56) References Cited

U.S. PATENT DOCUMENTS

| | | | | |
|---|---|---|---|---|
| 2,996,910 A | * | 8/1961 | Willis | 70/264 |
| 3,759,075 A | * | 9/1973 | Lipschutz | 70/159 |
| 4,030,322 A | * | 6/1977 | Pettit | 70/159 |
| 4,554,808 A | * | 11/1985 | Escaravage | 70/279.1 |
| 6,428,075 B2 | * | 8/2002 | Kamemizu et al. | 296/37.1 |
| 7,451,628 B1 | * | 11/2008 | Kim | 70/159 |
| 2006/0055196 A1 | * | 3/2006 | Yamada | 296/37.12 |
| 2006/0267364 A1 | * | 11/2006 | Katagiri | 296/37.12 |
| 2007/0114809 A1 | * | 5/2007 | Yukihara et al. | 296/37.8 |
| 2008/0007081 A1 | * | 1/2008 | Shibata et al. | 296/37.12 |
| 2008/0022730 A1 | * | 1/2008 | Dietrich et al. | 70/158 |
| 2009/0152877 A1 | * | 6/2009 | Kim | 292/174 |
| 2010/0071424 A1 | * | 3/2010 | Tsuruta | 70/91 |

FOREIGN PATENT DOCUMENTS

JP A-H6-146683 5/1994

* cited by examiner

Primary Examiner—Lloyd A Gall
(74) Attorney, Agent, or Firm—Posz Law Group, PLC (57) ABSTRACT

A lock system includes a lock mechanism for holding a lid element in a locked state, an electric actuator for driving the lock mechanism to an unlocking side based on an operation of an open switch, and a key cylinder adapted to be operated to rotate by a key so as to be switched through the rotational operation to an "UNLOCK" position where the open switch is enabled to function and a "LOCK" position where the open switch is disabled from functioning, whereby unlocking of the lid element is prohibited through a rotational operation of the key cylinder to the "LOCK" position. An operating unit of the lock system causes the key cylinder and the lock mechanism to be mechanically linked with each other by a wire cable, whereby the lock mechanism is forcibly driven to the unlocking side through a rotational operation of the key cylinder to the "OPEN" position.

6 Claims, 10 Drawing Sheets

LOCK SYSTEM OF SMALL ARTICLE COMPARTMENT IN VEHICLE

BACKGROUND OF THE INVENTION

1. Field of the Invention

The present invention relates to a lock system of a small article compartment in a vehicle in which a lock mechanism is actuated by an electric actuator to unlock an openable/closable portion of the small article compartment.

2. Related Art

Normally, a small article compartment for accommodating small articles is provided in a passenger compartment or cabin of a vehicle. In addition, in such small article compartments, there is one in which an openable/closable portion such as a lid for closing the accommodation space is provided and the openable/closable portion is made to be held in a locked state by means of a lock mechanism. In a conventional lock system for a small article compartment which has such an openable/closable portion, although a manual unlocking mechanism such as a push-type knob is provided for unlocking mechanically the openable/closable portion locked by the lock mechanism by a manual operation, with a view to reducing a laborious load associated with such an unlocking operation, there has been proposed a lock system in which an electric actuator and a switch for switching on and off the activation of the actuator are provided, so that the locking by a lock mechanism is released based on activation of the electric actuator in association with the switch being operated to switch on the actuator.

JP-A-6-146683 describes a lock system for a small article compartment in a vehicle which includes such an electric actuator in which a key cylinder is provided which can be operated to rotate by a specific key, so that the functions of the switch are switched between enablement and disablement through rotational operations of the key cylinder. In the event that the lock system described is adopted, by the key cylinder being operated to disable the switch from operating, the opening of the small article compartment by a person who has no key thereto can be made to be prohibited. Namely, the increase in security can be realized.

Incidentally, in the lock system for a small article compartment in a vehicle in which the locking of the openable/closable portion by the lock mechanism is released by the electric actuator, in the event that the electric actuator becomes unable to be activated due to contact failure of wiring, switch failure or troubled battery, the small article compartment cannot be opened.

Here, even in the event that the electric actuator cannot be activated, it is considered to adopt a configuration in which a mechanism for manually unlocking the small article compartment is provided further so as to forcibly open the small article compartment even in the event that the electric actuator cannot be activated. However, when such a mechanism is provided, since it becomes possible to open manually the small article compartment irrespective of the switch being enabled or disabled, it becomes difficult to ensure security.

SUMMARY OF THE INVENTION

The invention has been made in view of these situations, and an object thereof is to provide a lock system of a small article compartment in a vehicle which enables a manual opening of the small article compartment while ensuring security even in the event that the electric actuator is disabled from functioning.

Hereinafter, a means for attaining the object and the function and advantage thereof will be described.

According to a first aspect of the invention, there is provided a lock system of a small article compartment in a vehicle including a lock mechanism for holding an openable/closable portion of a small article compartment in a vehicle in a locked state, an electric actuator for driving the lock mechanism to an unlocking side based on an operation of a switch so as to permit the opening of the openable/closable portion and a key cylinder adapted to be put in a state where a rotational operation is enabled by a specific key being inserted thereinto so as to be switched to a position where the switch is enable to function and a position where the switch is disabled from functioning through the rotational operation, unlocking of the openable/closable portion by the lock mechanism being prohibited by the key cylinder being switched to the position where the switch is disabled from functioning, the lock system including a forcible unlocking mechanism which is mechanically linked between the key cylinder and the lock mechanism for forcibly driving the lock mechanism to the unlocking side by the key cylinder being operated to a position other than the position where the switch is enabled to function and the position where the switch is disabled from functioning.

According the configuration described above, even in the event that electric actuator cannot be activated due to contact failure of wiring, switch abnormality or troubled battery, by operating to rotate the key cylinder to the position other than the position where the switch is enabled to function and the position where the switch is disabled from functioning, the lock mechanism is forcibly activated so that the openable/closable portion such as a lid can be unlocked, whereby the small article compartment can be opened. In addition, since the forcible unlocking mechanism is configured to forcibly drive the lock mechanism through the rotational operation of the key cylinder which can be operated to rotate by the specific key being inserted thereinto, the opening of the small article compartment by a person who does not have the key thereto can be prohibited so as to ensure security. Namely, according to the first aspect of the invention, even in the event that the electric actuator is disabled from functioning, the manual opening of the small article compartment is enabled while ensuring security.

According to a second aspect of the invention, there is provided a lock system of a small article compartment in a vehicle as set forth in the first aspect of the invention, wherein the position to which the key cylinder is operated to forcibly drive the lock mechanism to the unlocking side is set to a specific operating position other than the position where the switch is enabled to function and the position where the switch is disabled from functioning, and wherein the forcible unlocking mechanism is made to forcibly drive the lock mechanism to the unlocking side by pulling in a deformable wire material connected to the lock mechanism in association with the key cylinder being operated to the specific operating position.

Specifically, as according to the second aspect of the invention, by adopting the configuration in which the wire material connected to the lock mechanism is pulled in by the key cylinder being operated to rotate the specific operating position other than the position where the switch is enabled to function and the position where the switch is disabled from functioning, the lock mechanism can be made to forcibly be driven to the unlocking side. In addition, according to the second aspect of the invention, since the deformable wire material is made to be used for the mechanical link portion between the key cylinder and the lock mechanism, even in the event that the lock mechanism and the key cylinder are provided in such a manner as to be spaced apart from each other, these members can be made to be linked with each other comparatively easily, thereby making it possible to increase the degree of freedom in disposition thereof.

According to a third aspect of the invention, there is provided a lock system of a small article compartment in a vehicle as set forth in the second aspect of the invention, wherein the wire material is made up of a wire cable, whose key cylinder side end portion is connected to a slidable trigger, and wherein there is provided on the key cylinder a push portion which is brought into engagement with the trigger in association with the key cylinder being operated to the specific operating position so as to cause the trigger to slide in a direction in which the wire cable is pulled in.

In addition, as according to the third aspect of the invention, as the deformable wire material, it is desirable from the viewpoint of strength and flexibility, and operability to adopt a wire cable in which a metallic wire is slidably passed through a tubular cover. In addition, according to the configuration in which the push portion provided on the key cylinder and the trigger connected with the lock mechanism by the wire cable are brought into engagement with each other in association with the key cylinder being operated to the specific operating position, and the wire cable is operated to be pulled in by virtue of cooperation of the push portion with the trigger, even in the event that the forcible unlocking mechanism is adopted, the mechanical linkage between the key cylinder and the lock mechanism is formed only when the forcible unlocking mechanism is necessary, whereby the disturbance to the activation or driving of the lock mechanism by the electric actuator can preferably be avoided.

According to a fourth aspect of the invention, there is provided a lock system of a small article compartment in a vehicle as set forth in the second or third aspect of the invention, wherein in the positions to which the key cylinder is operated to rotate, the position where the switch is disabled from functioning and the specific operating position where the locking by the lock mechanism is forcibly released are provided, respectively, in a clockwise direction and a counterclockwise direction about the position where the switch is enabled to function.

According to the configuration described above, the specific operating position for forcibly releasing the locking by the lock mechanism is adjacent to the position where the switch is enabled to function and is provided in the opposite position to the position where the switch is disabled from functioning across the position where the switch is enabled to function. By this configuration, the operating direction in relation to the forcible unlocking becomes the same as the direction to enable the switch to function, that is, the operating direction of the key cylinder in relation to the opening of the small article compartment, whereby the operation method in relation to the forcible unlocking is easy to be understood instinctively by the occupant.

According to a fifth aspect of the invention, there is provided a lock system of a small article compartment in a vehicle as set forth in any of the first to fourth aspects of the invention, wherein the switch is made up of a button switch.

Specifically, as according to the fifth aspect of the invention, by adopting the button switch as the switch, the locking by the lock mechanism can be made to be completed only by depressing the button switch, thereby making it possible to enhance the operability thereof.

According to a sixth aspect of the invention, there is provided a lock system of a small article compartment in a vehicle as set forth in any of the first to fifth aspects of the invention, wherein enablement and disablement of the function of the switch is switched by a hidden switch which is connected electrically in series with the switch to be held in an on state with the key cylinder in the position where the switch is enabled to function and to be put in an off state by the key cylinder being operated to rotate the position where the switch is disabled from functioning.

As according to the sixth aspect of the invention, by providing the hidden switch which is connected electrically in series with the switch so as to be switched between on and off depending upon the operating positions of the key cylinder, when the key cylinder is operated to the position where the switch is disabled from functioning, a circuit for supplying power to the electric actuator is made to be opened to ensure the disablement of the function of the switch, thereby making it possible to ensure security preferably.

According to a seventh aspect of the invention, there is provided a lock system of a small article compartment in a vehicle as set forth in any of the first to sixth aspects of the invention, wherein the small article compartment which is an object of installation of the lock mechanism is a glove box provided in a front seat passenger side instrument panel, and wherein the switch and the key cylinder are provided in the vicinity of the driver of the vehicle.

Specifically, as according to the seventh aspect of the invention, the lock system of a small article compartment in a vehicle can be applied as a lock system of a glove box provided in the front seat passenger side instrument panel. In a small article compartment in which the lock mechanism is manually operated to open the accommodation space, since the farther the manual unlocking mechanism such as the push-type knob is provided to be spaced apart from the lock mechanism, the longer the mechanical link becomes which links the lock mechanism with the manual unlocking mechanism, the laborious load involved in the unlocking operation becomes larger. Due to this, in the glove box provided in the front seat passenger side instrument panel, in the event that the lock system is adopted in which the lock mechanism is manually operated, for the purpose of suppressing an excessive increase in laborious load involved in an unlocking operation, the manual unlocking mechanism is generally provided in the vicinity of the lock mechanism. As a consequence, the manual unlocking mechanism is provided in a position which is spaced away from the driver's seat and becomes difficult to be operated by the driver in the driver's seat. On the other hand, in the event that the lock system set forth in the first to sixth aspects of the invention is adopted in which the locking by the lock mechanism is released by the electric actuator, even when the switch for activating the electric actuator is provided in the position which is spaced away from the lock mechanism, since the increase in load involved in the operation thereof can be avoided, it becomes possible to provide the switch comparatively freely. This allows the switch to be provided in the position near the driver's seat, thereby making it possible to enhance the operability of the switch by the driver. Because of this, as according to the seventh aspect of the invention, it is desirable to the first to sixth aspects of the invention are applied to the lock system of the glove box provided in the front seat passenger side instrument panel to adopt the configuration in which the switch and the key cylinder are provided in the vicinity of the driver's seat. In addition, by adopting the configuration described, since the switch for opening the glove box does not have to be provided on the front seat passenger side instrument panel, the occupants can be made to feel a well-organized impression, and the design characteristic can also be enhanced.

According to the lock system of a small article compartment in a vehicle of the invention, since the lock mechanism can forcibly be driven to the unlocking side to forcibly release the locking by the lock mechanism by rotating the key cylinder adapted to be operated to rotate by the specific key being inserted thereinto, even in the event that the electric actuator becomes unable to function properly, the small article compartment can be opened while ensuring security.

DETAILED DESCRIPTION OF THE PREFERRED EMBODIMENTS

Hereinafter, a lock system of a small article compartment in a vehicle according to the invention will be described based on an embodiment in which the invention is embodied into a lock system of a glove box, by reference to FIGS. 1 to 11E.

Figure 1:
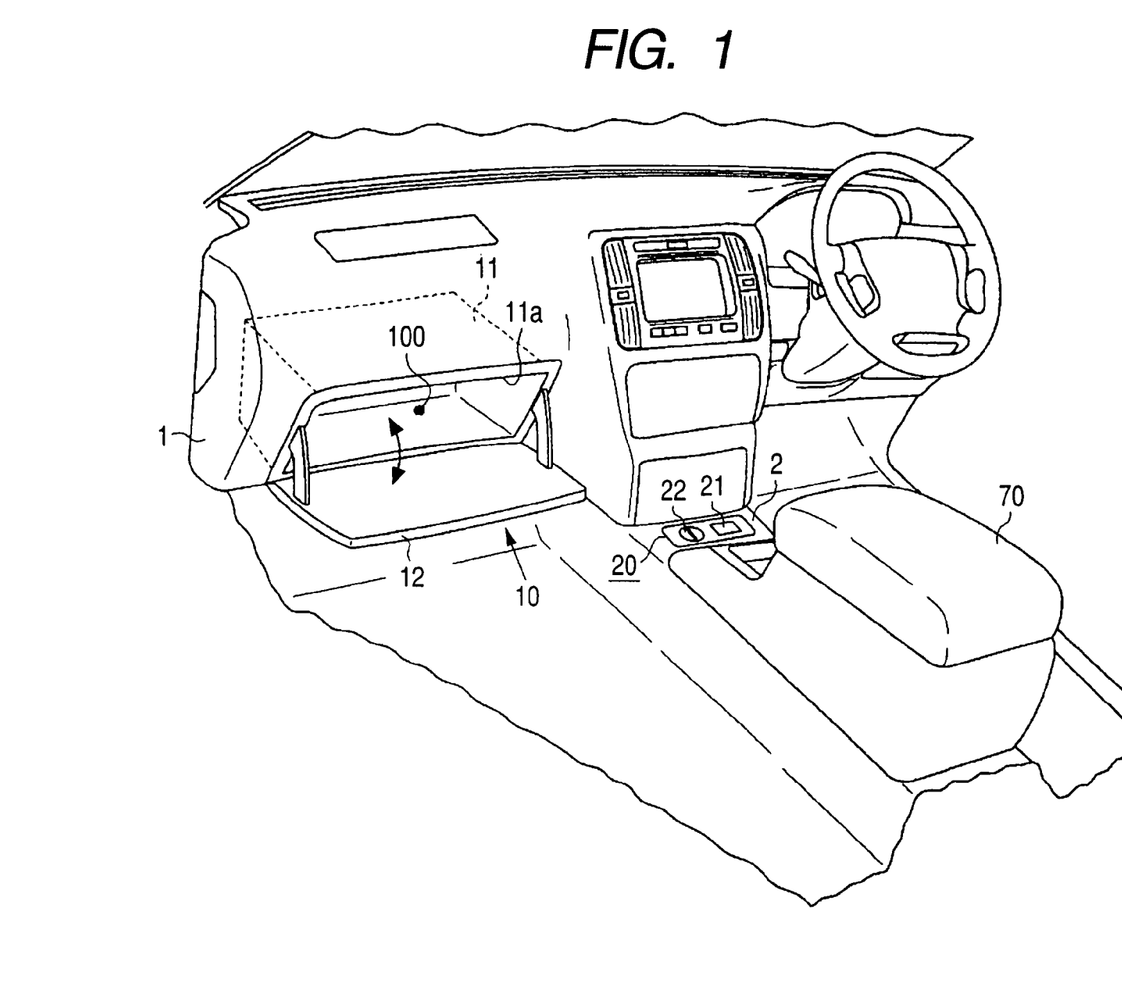
FIG. 1 is a perspective view showing a glove box which includes a lock system according to an embodiment of the invention, and a mode of providing an operating unit of the lock system within a cabin.

FIG. 1 shows a mode of providing a glove box 10 in which a lock system according to this embodiment is installed and an operating unit 20 of the lock system within a passenger compartment or cabin of a vehicle. As is shown in FIG. 1, an instrument panel 1 is provided within the cabin of the vehicle in such a manner as to confront front seats (whose illustration is omitted). The glove box 10 is provided in a part of the instrument panel 1 which confronts a front passenger seat. The glove box 10 is configured to include a box-shaped glove box main body 11 which defines an accommodation space 100 which is made to open to the interior of the cabin and a lid element 12 which closes and opens an opening 11a of the glove box main body 11. In addition, the lid element 12 is formed into a plate shape so that it becomes substantially flush with the instrument panel 1 in such a state that the lid element 12 closes the opening 11a.

In addition, the operating unit 20 which includes an open switch 21 made up of a button switch for opening the lid element 12 of the glove box 10 is provided on a center console 2 which partitions the cabin into a driver's seat side and a front passenger seat side. In addition, a key cylinder 22 is provided in this operating unit 20 which can be operated to rotate by a specific key such as, for example, a mechanical key for unlocking a door lock of the vehicle being inserted thereinto.

Next, referring to FIGS. 2A, 2B and 3, a lock mechanism will be described which locks the glove box 10 by holding the lid element 12 in a closed state where the opening 11a is closed. Note that FIGS. 2A and 2B are perspective views which show the glove box 10 as being removed from the instrument panel 1, FIG. 2A showing a state where the opening 11a is kept closed by the lid element 12, FIG. 2B showing a state where the opening 11a is kept opened.

Figure 2A:
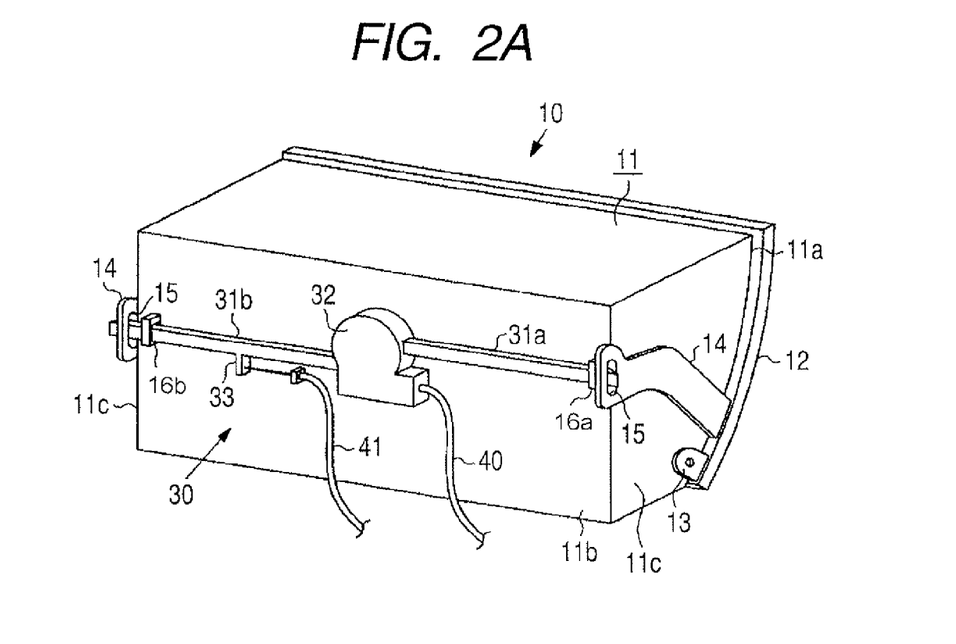
FIGS. 2A and 2B are perspective views showing a lock mechanism of the glove box according to the embodiment.
Figure 2B:
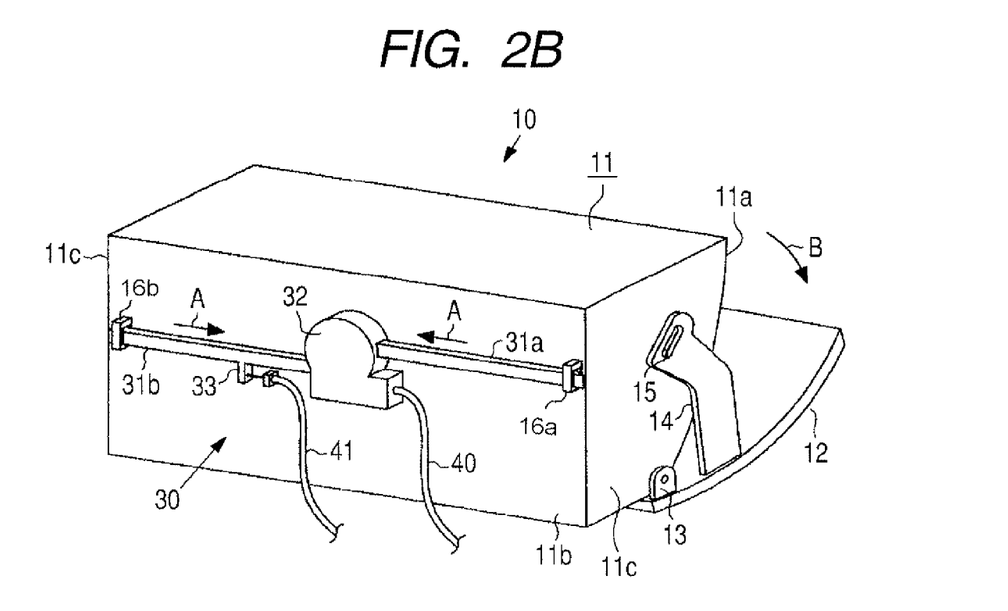

As is shown in FIGS. 2A and 2B, a lock mechanism 30 for holding the lid element 12 in the closed state is provided on a back surface 11b of the glove box main body 11. As is shown in FIG. 2A, the lock mechanism 30 is configured to include an actuator 32 which is fixed substantially to a center of the back surface 11b of the glove box main body 11 and lock pins 31a, 31b which extend from the actuator 32 towards both side surfaces 11c of the glove box main body 11.

The lock pins 31a, 31b are supported so as to reciprocate in a horizontal direction in such a state that the lock pins 31a, 31b are passed, respectively, through ring-shaped supporting portions 16a, 16b which are formed, respectively, at horizontal end portions of the back surface 11b and respective distal end portions of the lock pins 31a, 31b are made to project from the back surface 11a towards the side surfaces 11c.

The lid element 12 of the glove box 10 is supported rotatably on the glove box main body 11 by fasteners 13 and rotates about a lower end side thereof to close or open the opening 11a of the glove box main body 11. Support plates 14, which extend, respectively, along the side surfaces 11c of the glove box main body 11, are fixed, respectively, to horizontal end portions of the lid element 12, and engagement holes 15, with which the lock pins 31a, 31b of the lock mechanism 30 are brought into engagement, are formed, respectively, in the support plates 14. By this configuration, in such a state that the lid element 12 closes the opening 11a of the glove box main body 11 as is shown in FIG. 2A, the distal end portions of the lock pins 31a, 31b are inserted in the engagement holes 15, whereby the lid element 12 is held in the closed state through engagement of the lock pins 31a, 31b with the corresponding engagement holes 15.

Figure 3:
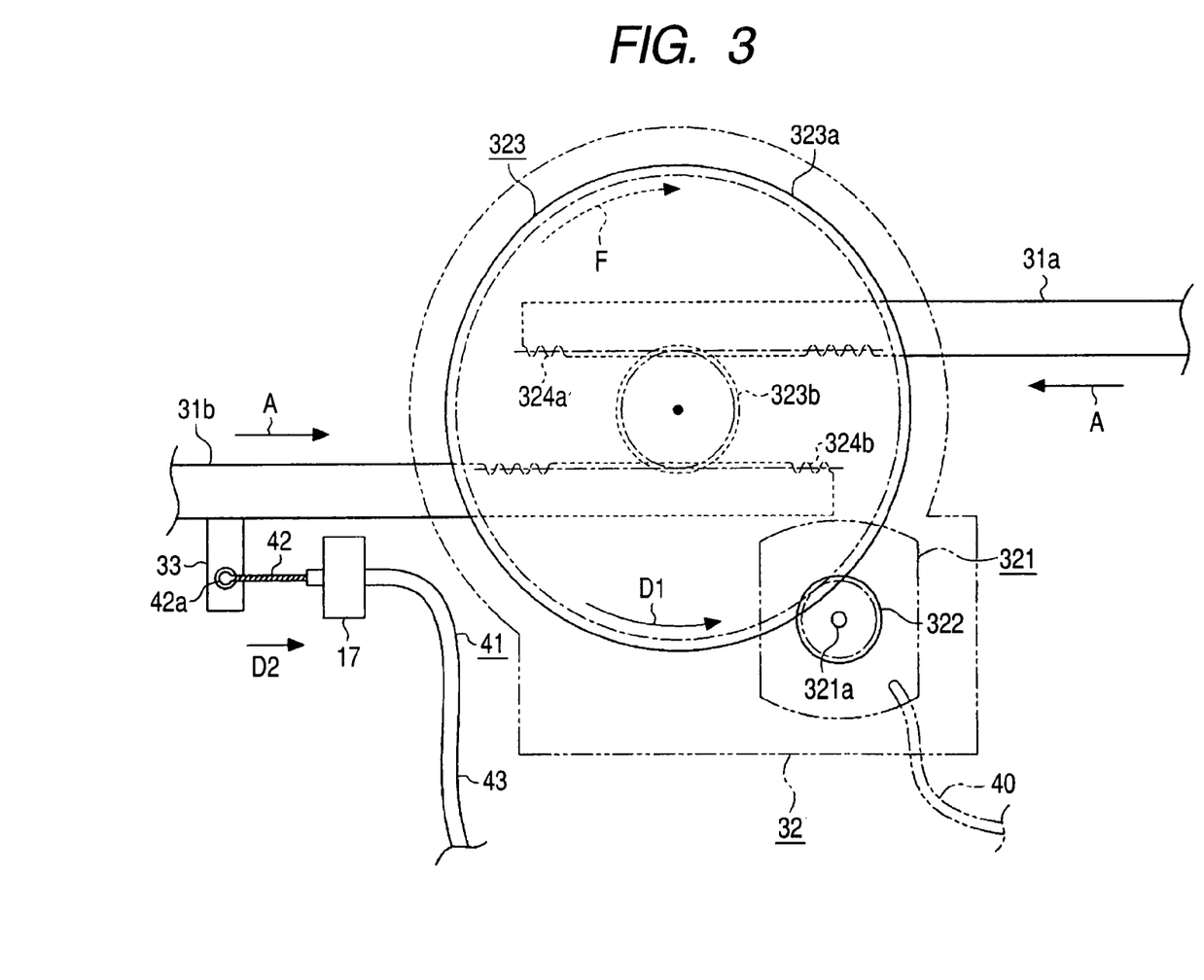
FIG. 3 is an enlarged view showing an internal construction of the lock mechanism of the lock system of the embodiment.

Next, referring also to FIG. 3, the construction of the actuator 32 of the lock mechanism 30 will further be described in detail. Note that FIG. 3 is an enlarged view showing an internal construction of the actuator 32. As is shown in FIG. 3, the actuator 32 includes an electric motor 321 as a source for generating its driving power. A pinion 322 is fixed to an output shaft 321a of the motor 321. In addition, this pinion 322 meshes with a large-diameter gearwheel 323a of a reduction gear 323 in which the large-diameter gear wheel 323a and a small-diameter gearwheel 323b, which have the same rotational center, are connected together in such a manner as to rotate together. On the other hand, the small-diameter gearwheel 323b of the reduction gear 323 meshes with rack teeth 324a formed on the lock pin 31a and rack teeth 324b formed on the lock pin 31b in such a manner as to be held between the rack teeth 324a and the rack teeth 324b. Note that a spring, not shown, is connected to the reduction gear 323 and hence, a biasing force F indicated by an arrow shown by a broken line in FIG. 3 is exerted thereto at all times. In this configuration, since the biasing force F is transmitted to the lock pins 31a, 31b which are made to mesh with the reduction gear 323 via the reduction gear 323, the lock pins 31a, 31b are biased towards the side surfaces 11c of the glove box main body 11 at all times.

When the power is supplied to the motor 321 whereby the motor 321 is driven, the reduction gear 323 is caused to rotate against the biasing force F in a direction indicated by an arrow D1 in FIG. 3 by virtue of the driving force of the motor 321, and the lock pins 31a, 31b which mesh with the reduction gear 323 via the rack teeth 324a, 324b are caused to move, respectively, in directions indicated by arrows A in FIG. 3.

In this way, the lock pins 31a, 31b are caused to move against the biasing force F of the spring by virtue of the driving force of the motor 321 and are then pulled into the actuator 32 as is indicated by arrows A in FIG. 2B, whereby the engagement with the engagement holes 15 of the support plates 14 and the lock pins 31a, 31b is released. This allows the lid element 12 to rotate by gravity as is indicated by an arrow B in FIG. 2B and the opening 11a of the glove box 11 is opened. In addition, the movement of the lock pins 31a, 31b which occurs when they are driven by the motor 321 is restricted by stoppers, not shown. Namely, even when the lock pins 31a, 31b continue to be driven by the motor 321, the lock pins 31a, 31b are brought into abutment with the stoppers and are then held in such a state that they are pulled into the actuator 32 by a predetermined amount.

In addition, in the lock system of the embodiment, as is shown in FIGS. 2A, 2B and 3, a wire cable 41 is connected to the left-hand lock pin 31b. As is shown in FIG. 3, this wire cable 41 is a deformable cable in which a metallic wire 42 is slidably inserted into a tubular cover 43. The cover 43 at a distal end portion of the wire cable 41 is fixed to a fixing member 17 provided on the back surface 11b of the glove box main body 11 and an end portion 42a of the wire 42 is connected to a connecting portion 33 formed on the lock pin 31b. By this configuration, by the wire 42 being pulled into the cover 43 as is indicated by an arrow D2 in FIG. 3, the lock pin 31b is caused to move in a direction indicated by an arrow A in FIG. 3. When the lock pin 31b moves in such a manner as to be pulled into the actuator 32 in the way described above, the reduction gear 323 rotates in a direction indicated by an arrow D1 in FIG. 3, and the lock pin 31a also moves in such a manner as to be pulled into the actuator 32. As a result, the engagement of the lock pins 31a, 31b with the engagement holes 15 is released, whereby the lid element 12 is made to open.

In this way, in the lock system of the embodiment, the locking by the lock mechanism 30 is made to be released by not only the actuator 32 but also the wire cable 41.

Figure 4:
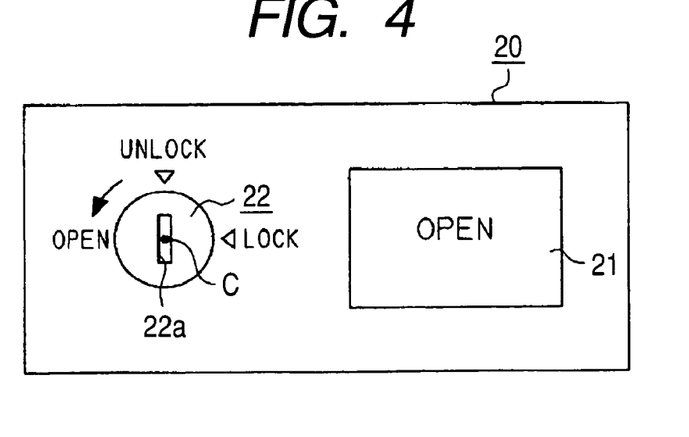
FIG. 4 is a front view of the operating unit of the lock system according to the embodiment.

Next, referring to FIGS. 4 to 11E, the operating unit 20 for operating the lock mechanism 30 will be described in detail. FIG. 4 is a front view of the operating unit 20 in such a state that it is mounted on the center console 2. As is shown in FIG. 4, the operating unit 20 includes the open switch 21 for actuating the motor 321 of the actuator 32 and the key cylinder 22 which can be operated to rotate by a specific key being inserted into a key hole 22a. In the key cylinder 22, an "UNLOCK" position where the open switch 21 is enabled to function is set in a 12 o'clock position with respect to a rotational axis C of the key cylinder 22, and a "LOCK" position where the open switch 21 is disabled from functioning is set in a three o'clock position which lies 90 degrees apart from the "UNLOCK" position in a clockwise direction. In addition, an "OPEN" position where the locking by the lock mechanism 30 is forcibly released is set in a position which lies the same distance apart from the "UNLOCK" position in a counterclockwise direction.

Figure 5:
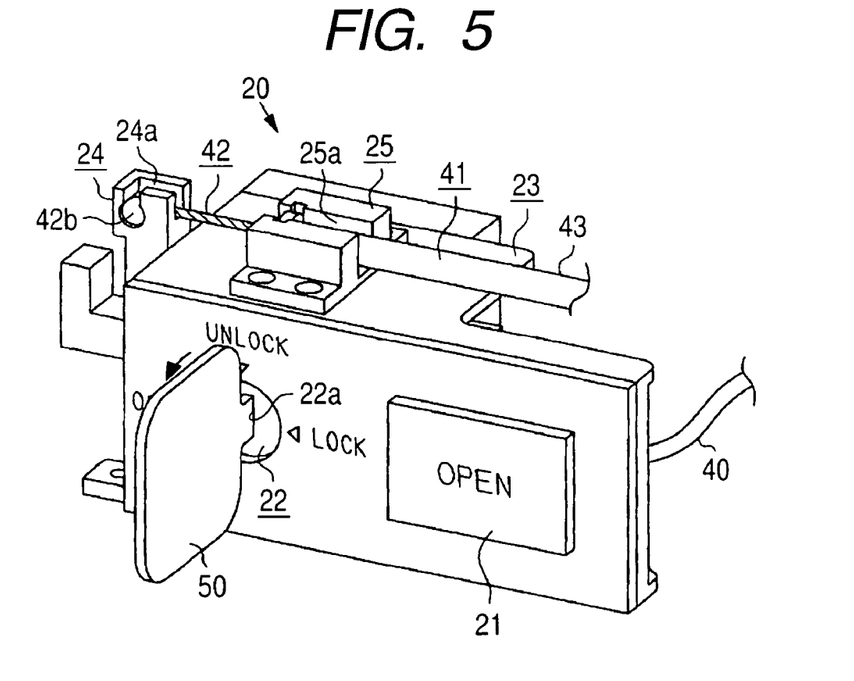
FIG. 5 is a perspective view of the operating unit of the lock system of the embodiment.

FIG. 5 is a perspective view showing the operating unit 20 as being removed from the center console 2. Note that FIG. 5 shows a state in which a key 50 for enable a rotational operation of the key cylinder 22 is being inserted in the key hole 22a. As is shown in FIG. 5, a fixing member 25 having a groove 25a formed on an upper surface thereof is fixed to a housing 23 of the operating unit 20, and a trigger 24 projects from a side surface of the housing 23. In addition, the other end portion 42b of the wire 42, the one end portion 42a of which is connected to the lock pin 31b as has been described above by reference to FIG. 3, in the wire cable 43 is fitted in a groove 24a formed on the trigger 24 for connection thereto, and the cover 43 of the wire cable 41 is fitted in the groove 25a of the fixing member 25 for connection thereto.

In addition, a power supply cable 40 for supply power to the motor 321 of the actuator 32 is connected to the operating unit 20. Then, as is shown in FIG. 5, with the key cylinder 22 operated to be in the "UNLOCK" position, when the open switch 21 is operated to be depressed, power is supplied to the motor 321.

Figure 6:
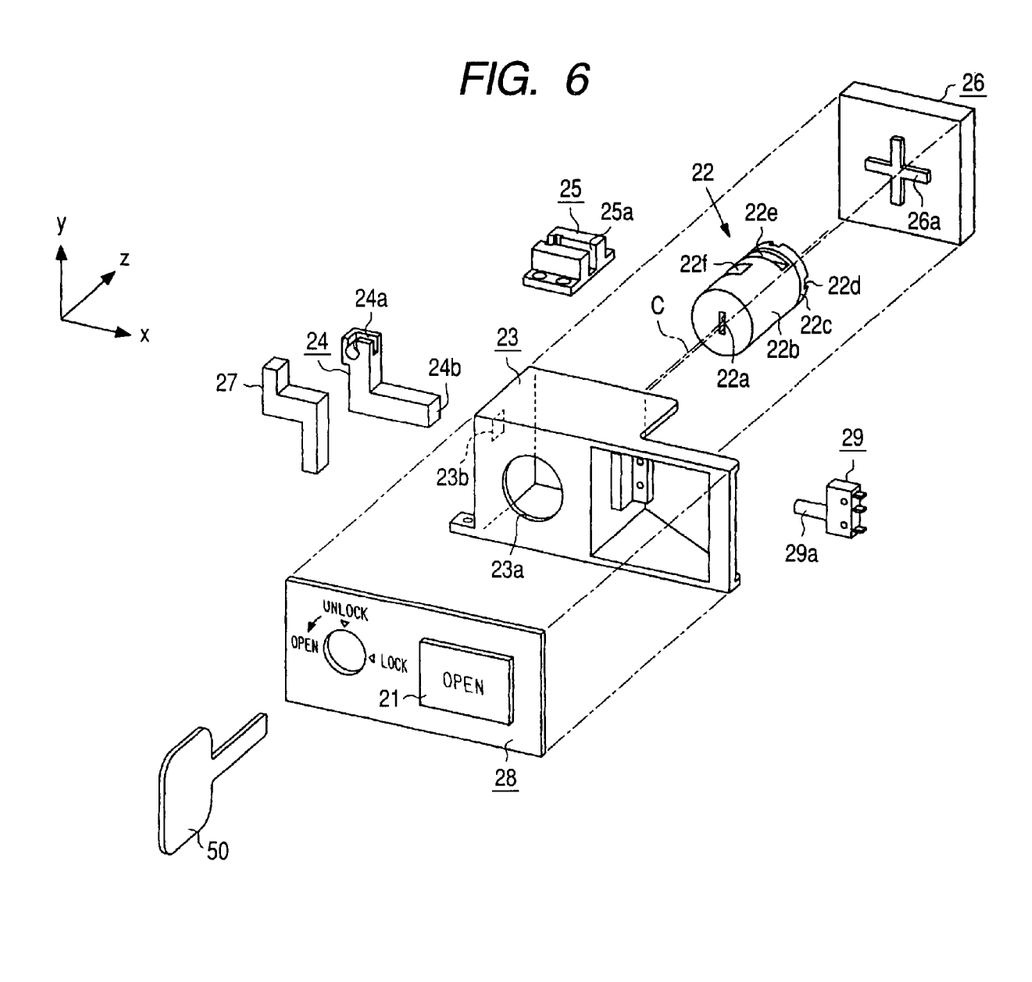
FIG. 6 is an exploded perspective view of the operating unit of the lock system of the embodiment.
Figure 7A:
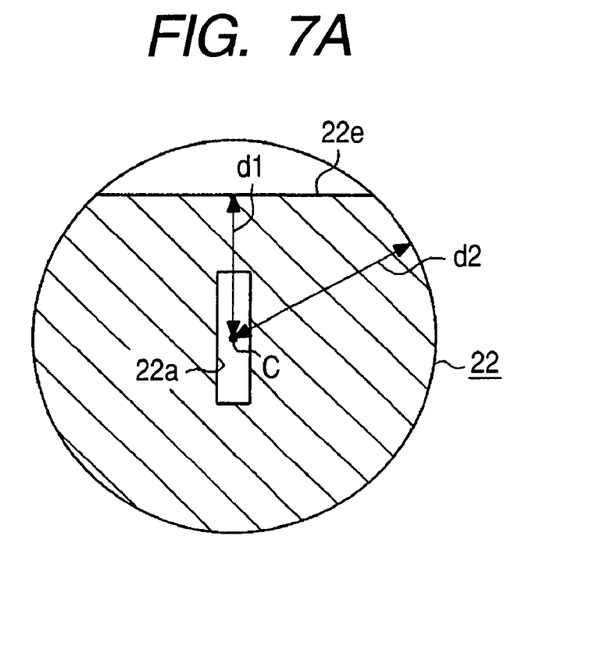
FIGS. 7A and 7B are sectional views of a key cylinder according to the embodiment.
Figure 7B:
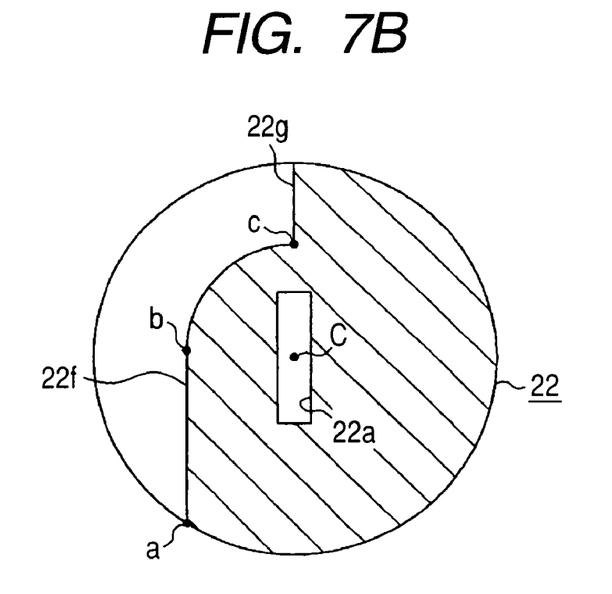

Next, referring also to FIGS. 6, 7A and 7B, the configuration of the operating unit 20 will be described further in detail. Note that FIG. 6 is an exploded perspective view of the operating unit 20, and FIG. 7 shows sectional views which show sections of the key cylinder 22 in an enlarged fashion. As is shown in FIG. 6, a through hole 23a is formed in a front surface of the housing 23 of the operating unit 20, and part of the key cylinder 22 of a cylindrical shape is inserted in this through hole 23a.

The key cylinder 22 is made up of a rotating portion 22b in which the key hole 22a is formed into which the key 50 is inserted and a fixed portion 22c which is fixed to a rear plate 26 which is fixed, in turn, to a rear surface of the housing 23. In addition, in the key cylinder 22, with the key 50 inserted in the key hole 22a, a relative rotation about the rotational axis C which is parallel to a z axis in FIG. 6 is enabled between the rotating portion 22 and the fixed portion 22c.

A cross-shaped groove 22d is formed on the fixed portion 22c in such a manner as to mesh with a cross-shaped projection 26a formed on the rear plate 26, whereby the projection 26a and the groove 22d mesh with each other by the rear plate 26 and the housing 23 being fixed together with the key cylinder 22 inserted in the housing 23, so as to restrict the rotation of the fixed portion 22c relative to the housing 23.

On the other hand, the rotating portion 22b is made to rotate relatively with respect to the fixed portion 22c in such a state that the key 50 is inserted in the key hole 22a as has been described above. Because of this, the key cylinder 22 can be operated to rotate by the key 50 being inserted into the key hole 22a even in such a state that the fixed portion 22c is fixed to the housing 23 through the rear plate 26 in such a manner as not to rotate.

In addition, two grooves 22e, 22f are formed on a side surface of the rotating portion 22b of the key cylinder 22. As is shown in FIG. 7A, the groove 22e is formed in such a manner as to extend to intersect a direction in which the key hole 22a, which extends long in a vertical direction, extends at right angles or in a horizontal direction as viewed in FIG. 7A. In the portion where the groove 22e is formed, a distance d1 from the rotational axis C of the key cylinder 22 to a bottom of the groove 22e is made smaller than a distance d2 from the rotational axis C to an outer circumferential surface of the key cylinder 22.

On the other hand, the groove 22f is formed in such a manner that it extends rectilinearly in parallel with the extending direction of the key hole 22a from a point a which lies left bottom as viewed in FIG. 7B to a point b which lies in a nine o'clock direction relative to the rotational axis C of the key cylinder 22 and then curves from the point b to a point c which lies in a 12 o'clock direction relative to the rotational axis C of the key cylinder 22. By this configuration, as is shown in FIG. 7B, a push portion 22g whose outside diameter changes largely is formed above the portion of the key cylinder 22 where the groove 22f is formed.

A through hole 23b is formed in a left-hand side surface of the housing 23 as viewed in FIG. 6, and a distal end 24b of the L-shaped trigger 24 slides in an x axis direction as viewed in FIG. 6 to be passed through hole 23b so formed. Then, the distal end 24b of the trigger 24 is inserted in the groove 22f of the key cylinder 22 which is now inserted in the housing 23. In addition, a stopper 27 for restricting the sliding of the trigger within a predetermined range is fixed similarly to the left-hand side surface of the housing 23. In addition, as described previously, the groove 24a is formed on the trigger 24 into which the end portion 24 of the wire 42 is fitted.

The fixing member 25 is fixed to the upper surface of the housing 23 as has been described before, so that the cover 43 of the wire cable 41, not shown, is fixed to the fixing member 25, and the end portion 42b of the wire 42 is fitted in the groove 24a of the trigger 24.

In addition, a hidden switch 29 is fixed to a right-hand side surface of the housing 23 as viewed in FIG. 6. In the hidden switch 29, a detection button 29a is brought into contact with the outer circumferential surface of the key cylinder 22, and as the key cylinder 22 is operated to rotate, the hidden switch 29 is fixed in a position where the groove 22e and the detection button 29a can confront each other. This hidden switch 29 has a normally open contact which is put in an energized state when the detection button 29a is pushed to switch on the hidden switch 29, and the function of the open switch 21 is switched to enablement or disablement by the normally open contact being closed or opened through an on or off operation of the detection button 29a.

A panel 28 on which the open switch 21 is provided is fixed to the front surface of the housing 23. In the lock system of this embodiment, a drive circuit for supplying power to the motor 321 is formed to include the hidden switch 29 and the open switch 21.

Figure 8:
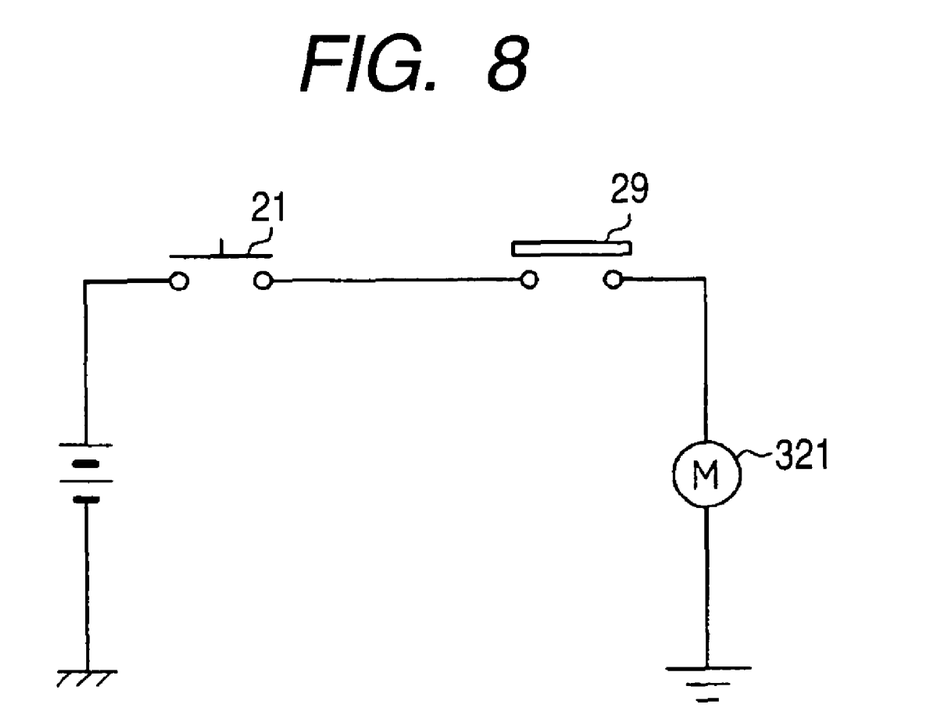
FIG. 8 is a circuit diagram of a drive circuit of the lock system according to the embodiment.

Next, referring to FIG. 8, the drive circuit of the lock system which is configured to include the open switch 21 and the hidden switch 29 will be described. Note that FIG. 8 is a circuit diagram of the drive circuit. As is shown in FIG. 8, the open switch 21, the hidden switch 29 and the motor 321 are connected electrically in series with each other. Because of this, in such a state that the normally open contact of the hidden switch 29 is opened as is shown in FIG. 8, even though the open switch 21 is depressed, the circuit is not closed, and no power is supplied to the motor 321. Namely, the open switch 21 is disabled from functioning by the hidden switch 29, so that the opening of the glove box 10 by the open switch 21 is prohibited.

On the other hand, when the normally open contact of the hidden switch 29 is closed and the energized state is provided, the circuit is closed by the open switch 21 being depressed to supply power to the motor 321. Namely, the hidden switch 29 enables the open switch 21 to function, and by the open switch 21 being depressed, the actuator 32 is activated to release the locking by the lock mechanism 30, so that the glove box 10 can be opened.

Hereinafter, referring to FIGS. 9A to 11E, operation modes of the operating unit 20 when the key cylinder 22 is operated to be in the respective operating positions, "UNLOCK," "LOCK," and "OPEN" positions, will be described.

Figures 9A, 9B, 9D:
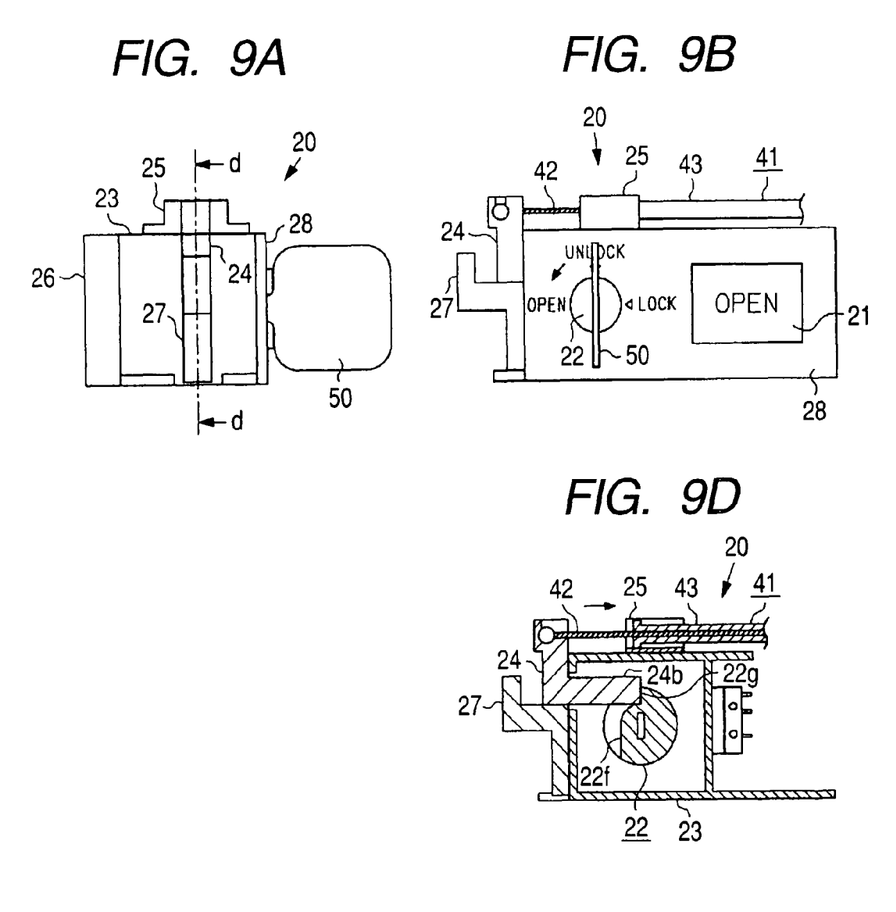
FIGS. 9A, 9B, 9C, 9D and 9E are three-plane views and sectional views showing a mode in which the operating unit of the lock system according to the embodiment is operated to an "UNLOCK" position.
Figure 9C:
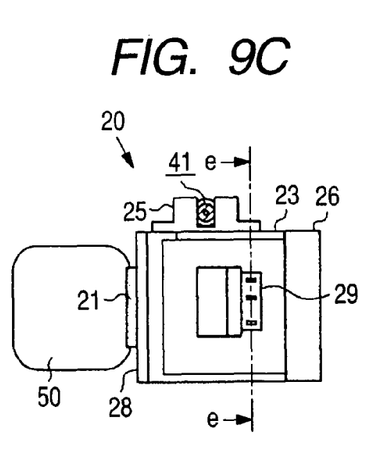
Figure 9E:
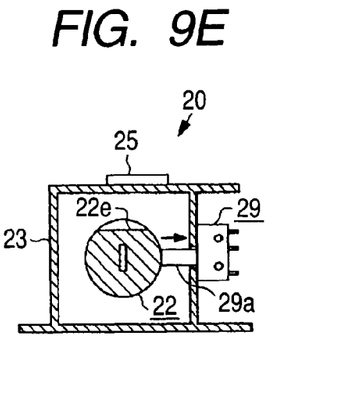

Firstly, an operation mode of the operating unit 20 will be described which will result when the key cylinder 22 is operated to be in the "UNLOCK" position. FIGS. 9A to 9E show a mode of the operating unit 20 when the key cylinder 22 is operated to be in the "UNLOCK" position, and FIGS. 9A, 9B, 9C are three-plane drawings of the operating unit 20, FIG. 9D is a sectional view taken along the line d-d in FIG. 9A, and FIG. 9E is a sectional view taken along the line e-e in FIG. 9C.

When the key cylinder 22 is operated to be in the "UNLOCK" position as is shown in FIG. 9A, the detection button 29a of the hidden switch 29 is in abutment with the outer circumferential surface of the key cylinder 22 as is shown in FIG. 9E and is pushed in a direction indicated by an arrow in FIG. 9E, whereby the hidden switch 29 is held in an on state. Because of this, in the drive circuit, the normally open contact of the hidden switch 29 is closed and the energized state is provided, whereby the open switch 21 is enabled to function. In addition, as is shown in FIG. 9D, the distal end 24b of the trigger 24 is inserted into the groove 22f of the key cylinder 22 to be in abutment with the push portion 22g. Here, the wire 42 of the wire cable 41 is biased to be pulled in the cover 43 by virtue of the biasing force F exerted on the lock pin 31b as is indicated by an arrow in the figure. However, since the trigger 24 is in abutment with the side surface of the housing 23, the trigger 24 is restricted from sliding towards the key cylinder 22, and hence, the biasing force is prevented from being transmitted to the key cylinder 22.

Figure 10A:
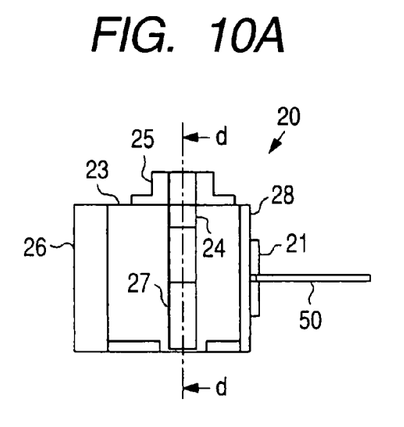
FIGS. 10A, 10B, 10C, 10D and 10E are three-plane views and sectional views showing a mode in which the operating unit of the lock system according to the embodiment is operated to a "LOCK" position.
Figure 10B:
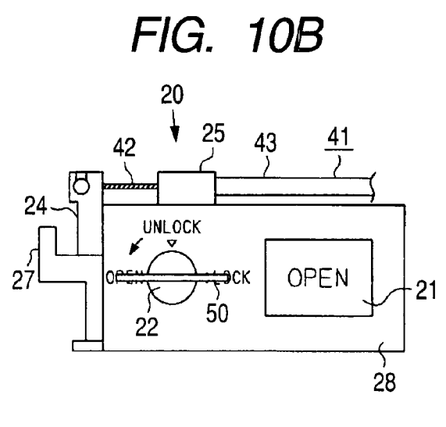
Figure 10C:
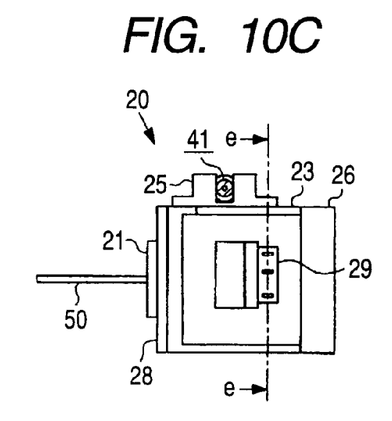
Figure 10D:
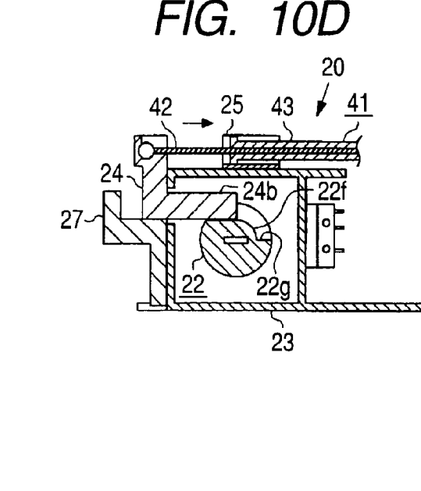
Figure 10E:
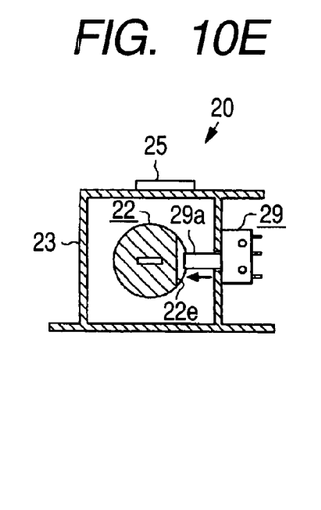

Next, an operation mode of the operating unit 20 will be described which will result when the key cylinder 22 is operated to be in the "LOCK" position. FIGS. 10A to 10E show a mode of the operating unit 20 which will result when the key cylinder 22 is operated to be in the "LOCK" position, FIGS. 10A, 10B and 10C are three-plane drawings of the operating unit 20, FIG. 10D is a sectional view taken along the line d-d in FIG. 10A, and FIG. 10E is a sectional view taken along the line e-e in FIG. 10C.

When the key cylinder 22 is operated to be in the "LOCK" position as is shown in FIG. 10A, the groove 22e of the key cylinder 22 comes to confront the detection button 29a of the hidden button 29 as is shown in FIG. 10E, and the pushed state of the detection button 29a is released as indicated by an arrow in FIG. 10E, whereby the hidden switch 29 is put in an off state. By this action, in the drive circuit, the normally open contact of the hidden switch 29 is put in an open state, and the circuit is put in an open state whether or not the open switch 21 is operated to be depressed. Namely, the open switch 21 is disabled from functioning, resulting in a state where the opening of the lid element 12 through operation of the open switch 21 is prohibited. In addition, as this occurs, as is shown in FIG. 10D, although the distal end 24b of the trigger 24 is inserted in the groove 22f of the key cylinder 22, the distal end 24b of the trigger 24 is spaced apart from the push portion 22g of the key cylinder 22, and hence, the engagement therebetween is now released.

Figure 11A:
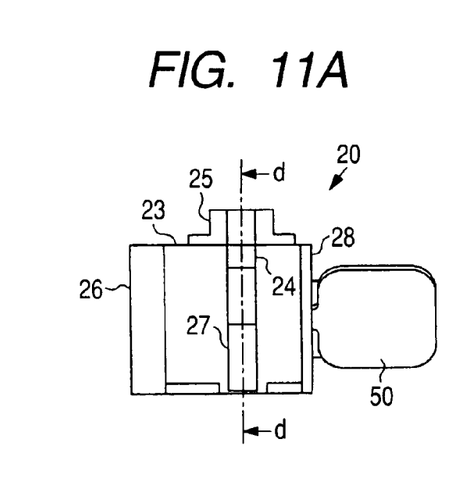
FIGS. 11A, 11B, 11C, 11D and 11E are three-plane views and sectional views showing a mode in which the operating unit of the lock system according to the embodiment is operated to an "OPEN" position.
Figure 11B:
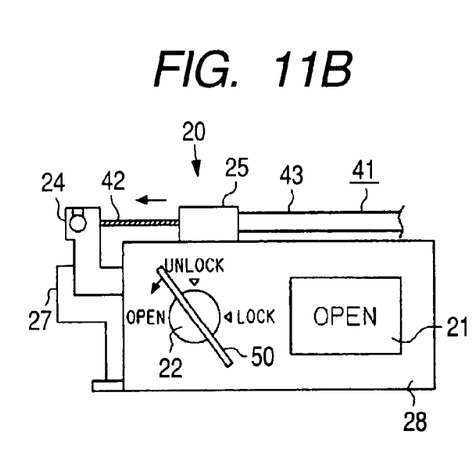
Figure 11C:
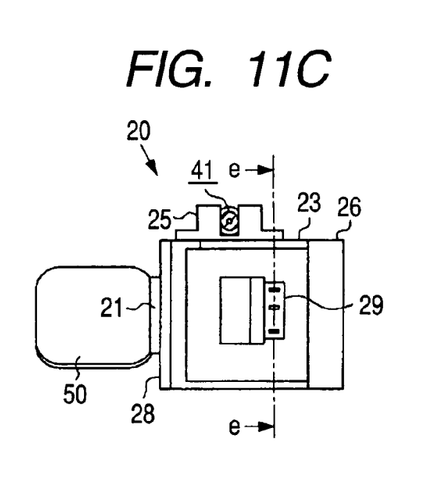
Figure 11D:
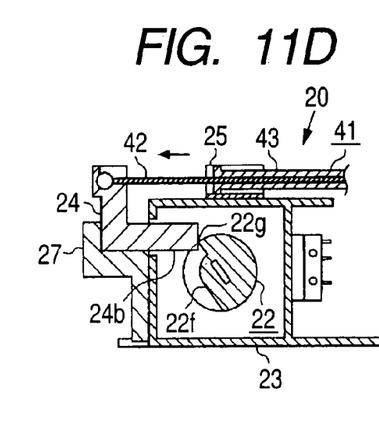
Figure 11E:
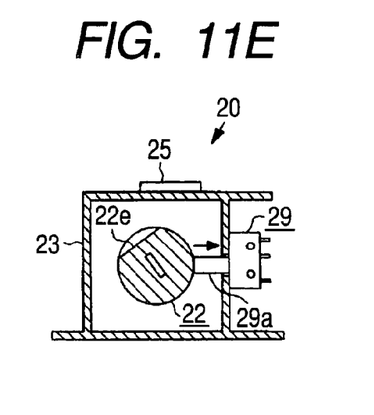

Lastly, an operation mode of the operating unit 20 will be described which will result when the key cylinder 22 is operated to be in the "OPEN" position. FIGS. 11A to 11E show a mode of the operating unit 20 which will result when the key cylinder 22 is operated further to rotate from the "UNLOCK" position to be in the "OPEN" position, and FIGS. 11A, 11B, 11C are three-plane drawings of the operating unit 20, FIG. 11D is a sectional view taken-along the line d-d in FIG. 11A, and FIG. 11E is a sectional view taken along the line e-e in FIG. 11C.

When the key cylinder 22 is operated further to rotate from the "LOCK" position in the counterclockwise direction to be in the "OPEN" position as is shown in FIG. 11A, as is shown in FIG. 11D, the push portion 22g of the key cylinder 22 causes the distal end 24b of the trigger 24 to slide in a leftward direction as viewed in FIG. 11D. By this action, as is indicated by an arrow in FIG. 11D, the wire 42 of the wire cable 41 is pulled in such a manner as to be pulled out of the cover 43, whereby the lock pin 31b of the lock system 30, which is mechanically connected via this wire cable 41, is pulled in the direction indicated by the arrow D2 in FIG. 3 in the way described by reference to FIG. 3. As a consequence, as the key cylinder 22 is operated to rotate, the lock mechanism 30 is forcibly driven, so that the locking of the lid element 12 by the lock mechanism 30 can be released.

According to the embodiment that has been described heretofore, the following advantage can be obtained.

(1) Even when the actuator 32 cannot be activated due to contact failure of wiring such as the power supply cable 40, abnormality of the open switch 21 or a troubled battery, the lock mechanism 30 is forcibly driven by the key cylinder 22 being operated to the "OPEN" position, so that the locking of the lid element 12 can be released so as to allow the glove box 10 to be opened. In addition, since the configuration is adopted in which the lock system 30 is forced to be driven through the rotational operation of the key cylinder 22 which can be operated to rotate by the specific key 50 being inserted thereinto, the opening of the glove box 10 by a person who does not have the key thereto is prohibited so as to ensure security. Namely, according to the lock system of the glove box 10 of this embodiment, even in the event that the actuator 32 is disabled from functioning properly, a manual opening of the glove box 10 can be enabled while ensuring security.

(2) The configuration is adopted in which the "OPEN" position is provided as the specific position other than the "UNLOCK" position where the open switch 21 is enabled to function and the "LOCK" position where the open switch 21 is disabled from functioning and the wire cable 41 connected to the lock mechanism 30 is pulled in by the key cylinder 22 being operated as far as this "OPEN" position, whereby the configuration can be realized in which the lock mechanism 30 is forcibly driven to the unlocking side where the locking by the lock mechanism 30 is released. In addition, since the deformable wire cable 41 is adopted in the mechanical link portion between the key cylinder 22 and the lock mechanism 30, even in the event that the lock mechanism 30 and the key cylinder 22 are provided in such a manner as to be spaced apart from each other as with the embodiment that has been described above, the key cylinder 22 and the lock mechanism 30 can be linked with each other comparatively easily, thereby making it possible to enhance the degree of freedom in disposition thereof.

(3) Since the wire cable 41 in which the metallic wire is slidably passed through the tubular cover is adopted as the deformable wire material which connects the lock mechanism 30 with the key cylinder 22, the strength, flexibility and operability which are required for the link mechanism for linking the lock mechanism 30 with the key cylinder 22 can be satisfied. In addition, according the configuration of the embodiment in which as the key cylinder 22 is operated to the "OPEN" position, the push portion 22g provided on the key cylinder 22 is brought into engagement with the trigger 24 connected to the lock mechanism 30 by the wire cable 41 and the wire cable 41 is operated to be pulled in by cooperation of the push portion 22g with the trigger 24, as the forcible unlocking mechanism for releasing the locking by the lock mechanism 30, the mechanical link of the key cylinder 22 with the lock mechanism 30 is allowed to be formed only when necessary, whereby the disturbance to the actuation of the lock mechanism 30 through driving by the motor 321 can preferably be avoided.

(4) The "OPEN" position where the locking by the lock mechanism 30 is forcibly released is adjacent to the "UNLOCK" position and is provided in the position opposite to the "LOCK" position across the "UNLOCK" position. By this configuration, the operating direction of the key cylinder 22 in relation to the forcible unlocking becomes the same as the operating direction of the key cylinder 22 in relation to enablement of the function of the open switch 21, that is, the operating direction of the key cylinder 22 in relation to opening of the glove box 10, the operation method in relation to the forcible unlocking becomes easy to be understood by the occupant in an instinctive fashion.

(5) In the embodiment, the push button is adopted as the open switch 21. By providing the open switch 21 which is made up of the button switch, the locking of the locking mechanism 30 can be completed only by depressing the open switch, thereby making it possible to enhance the operability thereof.

(6) In the embodiment, since the hidden switch 29 is provided which is connected electrically in series with the open switch 21 so as to be switched between on and off depending upon the operating position of the key cylinder 22, when the key cylinder 22 is operated to the "LOCK" position, the drive circuit for supplying power to the electric actuator 321 is made to be opened to ensure the disablement of the function of the open switch 21, thereby making it possible to ensure security preferably.

(7) In the small article compartment in which the lock mechanism is manually operated to open the openable/closable portion, since the farther the manual unlocking mechanism for releasing the locking by the lock mechanism is provided to be spaced apart from the lock mechanism, the longer and more complex the mechanical link becomes which links the lock mechanism with the manual unlocking mechanism, the laborious load involved in the unlocking operation becomes larger. In contrast to this, in the lock system of the embodiment, since the locking by the lock mechanism 30 is made to be released by the motor 321, even in the event that the open switch 21 for activating the motor 321 is provided in the position which is spaced away from the lock mechanism 30, the increase in load involved in the operation thereof can be avoided. Because of this, it becomes possible to provide the open switch 21 comparatively freely, and as with the lock system of the embodiment, the open switch 21 can be provided on the center console 2 which lies near the driver's seat, thereby making it possible to enhance the operability of the switch by the driver.

In addition, by adopting these configurations, since the switch for opening the glove box 10 does not have to be provided on the front seat passenger side instrument panel, the occupants can be made to feel a well-organized impression, and the design characteristic can also be enhanced.

In addition, the embodiment can also be carried out in the following forms in which the embodiment is modified as required.

In the embodiment, while the configuration has been illustrated in which the key cylinder 22 and the open switch 21 are provided on the operating unit 20, a configuration can be adopted in which the key cylinder 22 and the open switch 21 are provided in different positions as in a configuration in which the open switch 21 provided in the vicinity of the driver's seat independently of the operating unit 20.

In the embodiment, while the mechanical key for unlocking the door lock of the vehicle has been described as being adopted as the specific key 50, as a mechanical key like this, an ignition key for starting the engine of the vehicle, a mechanical key incorporated in a remote control key and the like can be adopted. In addition, a configuration can also be adopted in which a glove box key is provided exclusively as the specific key 50, and the key cylinder 22 is made to be operated using the exclusive glove box key.

In the embodiment, while the configuration has been illustrated in which the "OPEN" position is adjacent to the "UNLOCK" position and is provided in the position opposite to the "LOCK" position across the "UNLOCK" position, the invention is not limited to this configuration but may adopt others, and for example, a configuration can be adopted in which the "OPEN" position is provided adjacent to the "LOCK" position.

While as the link mechanism for mechanically connecting the lock mechanism 30 to the key cylinder 22, the configuration has been described in which the lock mechanism 30 and the key cylinder 22 are connected to each other by the wire cable 41, this is one example of link mechanisms, and the configuration of the link mechanism can be modified as required. For example, the lock mechanism 30 and the key cylinder 22 can also be connected to each other by a nylon thread or the like.

In addition, while the configuration has been illustrated in which the groove 22f is formed on the key cylinder 22 and the link is formed by the distal end 24b of the trigger 24 inserted in the groove 22f and the push portion 22g of the key cylinder 22 being brought into abutment with each other, the configuration of the link mechanism can be modified as required, provided that the lock mechanism 30 can forcibly be driven as the key cylinder 22 is operated to rotate. For example, a configuration can be adopted in which a deformable wire material which is connected to the lock mechanism 30 is directly fixed to the outer circumferential surface of the key cylinder 22, so that the wire material is taken up as the key cylinder 22 is operated to rotate, whereby the locking by the lock system 30 is forcibly released.

In the embodiment, while the configuration has been described in which the open switch 21 is made up of the button switch, the configuration of the switch for activating the motor 321 can be modified as required. For example, a lever type switch also can be adopted as the switch for activating the motor 321.

In the embodiment, while the configuration has been described in which the lock mechanism 30 is provided on the back surface 11b of the glove box main body 11, the invention is not limited to this configuration of the lock mechanism, the invention can be applied to any lock system, provided it is such that the locking by a lock mechanism is released by an electric actuator. For example, a configuration can be adopted in which a latch-like lock mechanism 30 is provided in which space is formed within a lid element 12 of the glove box and lock pins 31a, 31b are provided to reciprocate within this space as in the way described in the embodiment to thereby lock or unlock the lid element 12, so that the lid element 12 is held in a closed state.

In addition, while the latch-like lock mechanism 30 has been illustrated above in which the lid element 12 is locked or unlocked by reciprocating the lock pins 31a, 31b, the invention can also be applied to not only the latch-like lock mechanism 30 but also a lock mechanism in which a latch and a striker are brought into engagement with each other. In addition, in the lock system in which a lid element 12 is held by the latch and the striker being brought into engagement, the latch and a key cylinder 22 may be connected together by a link mechanism and the latch is made to be driven to an unlocking side by the cylinder 22 being operated to rotate.

In addition, in the embodiment, the glove box 10 has been described which includes the lid element 12 and in which the accommodation space 100 is opened or closed by the lid element 12. In contrast to this, there are glove boxes in which no lid is provided, and a glove box main body which is formed into a box shape is made to rotate to thereby open or close an opening thereof. The invention can also be applied to not only the glove box having the lid element but also the glove box in which the glove box main body is made to rotate or slide to thereby open or close its opening.

While the actuator 32 including the motor 321 has been described as the electric actuator, in addition to this type of lock system, the invention can be applied to a lock system which includes an electric actuator which generates driving force by means of an electromagnetic solenoid.

In the embodiment, while the lock system of a small article compartment in a vehicle of the invention has been described as being applied to the lock system of the glove box, this is one example which has embodied the invention, and hence, in addition to the glove boxy the invention can be applied to a lock system of other small article compartments such as, for example, a console box 70 provided in the center console 2 as is shown in FIG. 1.

What is claimed is:

1. A lock system for an article compartment in a vehicle, wherein the lock system comprises:
    a lock mechanism for holding an openable/closable portion of the article compartment in a locked state;
    an electric actuator for driving the lock mechanism to an unlocked position based on an operation of a switch so as to permit opening of the openable/closable portion;
    a key cylinder adapted to be put in a state where a rotational operation is enabled by a specific key being inserted thereinto so as to be switched to a first position where the switch is enabled to function and a second position, which is different from the first position and at which the switch is disabled from functioning, through the rotational operation, wherein unlocking of the openable/closable portion by the lock mechanism is prohibited by the key cylinder being switched to the second position; and
    a forcible unlocking mechanism which is mechanically linked between the key cylinder and the lock mechanism for forcibly driving the lock mechanism to the unlocked position by operating the key cylinder to a third position, which is different from the first position and the second position,
    wherein the forcible unlocking mechanism drives the lock mechanism to the unlocked position by pulling a deformable wire material connected to the lock mechanism in association with the key cylinder being rotated to the third position.

2. A lock system as set forth in claim 1, wherein
    the wire material is made up of a wire cable, whose key cylinder side end portion is connected to a slidable trigger, and
    there is provided on the key cylinder a push portion which is brought into engagement with the trigger in association with the key cylinder being operated to the third position so as to cause the trigger to slide in a direction in which the wire cable is pulled.

3. A lock system as set forth in claim 1, wherein the second position of the key cylinder is clockwise from the first posi tion of the key cylinder, and the third position is counterclockwise from the first position of the key cylinder.

4. A lock system as set forth in claim 1, wherein the switch is made up of a button switch.

5. A lock system as set forth in claim 1, wherein enablement and disablement of the function of the switch is switched by a hidden switch which is connected electrically in series with the switch to be held in an on state with the key cylinder in the first position and to be put in an off state by the key cylinder being rotated to the second position.

6. A lock system as set forth in claim 1, wherein
the article compartment is a glove box provided in a front seat passenger side instrument panel of the vehicle,
the lock mechanism is installed in the glove compartment, and
the switch and the key cylinder are provided between the glove box and a location where a driver sits in the vehicle.

\* \* \* \* \*